March 9, 1926.
H. WEICHSEL
ALTERNATING CURRENT MOTOR
Filed May 15, 1924
1,575,729
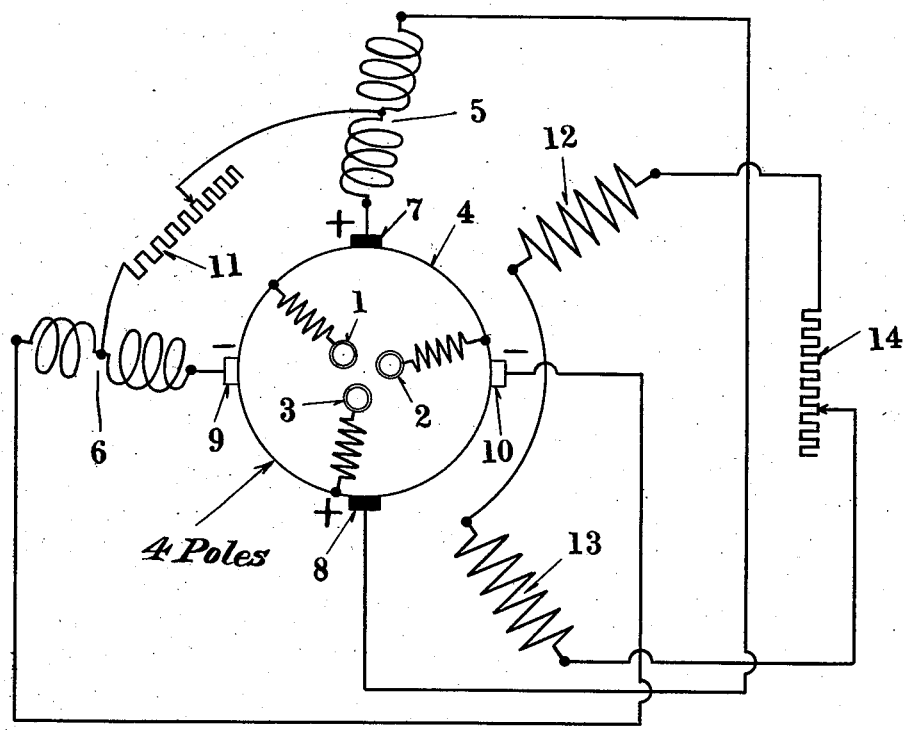
INVENTOR
Hans Weichsel
BY E. E. Huffman
ATTORNEY Patented Mar. 9, 1926.

1,575,729

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed May 15, 1924. Serial No. 713,422.

*To all whom it may concern:*

Be it known that I, HANS WEICHSEL, a citizen of the United States of America, residing at the city of St. Louis, State of Missouri, United States of America, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to an alternating current dynamo electric machine and particularly to multipolar synchronous and asynchronous alternating current motors which have a commuted winding for producing an exciting E. M. F. The invention comprises connections and relations of windings and brushes which avoid the use of cross-connectors between brushes of like polarity and prevent cross-currents that would develop in machines of this type if such cross-connector were used and would adversely affect commutation and increase internal losses. Other features and advantages of my invention will be hereinafter more fully described.

My invention is applicable to single phase as well as polyphase motors and to those having any number of poles more than two. In the accompanying drawing I have illustrated a four-pole polyphase synchronous motor embodying my invention.

The rotor and stator are preferably constructed without defined polar projections and with small air-gap, as is usual in induction motors. In the machine shown the rotor is the primary member and is provided with a polyphase winding supplied with current through slip rings 1, 2 and 3 and with a four-pole commuted winding 4. The stator is provided with exciting windings 5 and 6 adapted to produce four-pole magnetization, and on the commutator are located two pairs of brushes 7—8 and 9—10. As shown, these brushes are displaced by a small angle from the axes of the windings for the purpose of producing a good synchronizing torque and a unidirectional excitation in synchronous operation, one component of which is so located as to satisfactorily influence the power factor, as described in my previous application, Serial No. 674,131.

In accordance with my invention I connect each exciting winding in series with brushes of like polarity, winding 5 being in series with positive brushes 7—8 and winding 6 in series with the negative brushes 9—10. With this arrangement any cross-currents between brushes of like polarity—which may result from inexact spacing of the brushes, slight eccentricity of the rotor with respect to the stator, and variation of magnetic density from other causes—pass through the exciting windings. Due to the resistance of these windings the magnitude of these currents and therefore the losses and disturbing effects thereof are very greatly minimized. The circuit between the positive and negative brushes is completed by connecting the middle points of the windings 5 and 6, this connection being through adjustable resistance 11. It will be understood that the drawing is not intended to show the actual space positions of the parts of windings 5 and 6 on opposite sides of the points of connection to resistance 11. The two parts of these windings magnetize in opposite directions and are on opposite sides of the armature. The stator is also provided with starting windings 12 and 13 connected in series through adjustable resistance 14 and having their axes displaced, preferably by ninety electrical degrees, from the axes of the exciting windings.

Referring to the operation of the motor described, at starting the resistances 11 and 14 are adjusted to suitable value and the slip rings are connected to the supply. The windings 5—6 and 12—13 act as polyphase secondary windings and the machine starts with good torque and relatively small current. As the speed increases the resistances 11 and 14 can be reduced in one or more steps until the windings 12 and 13 are short-circuited and the resistance 11 brought to its operating value. It will be understood that at synchronism unidirectional current will be supplied to the exciting windings from the commutator and a unidirectional exciting magnetization thereby produced.

It will be noted that the arrangement described permits the use of a single resistance 11 in the exciting circuit instead of two separate resistances which would be necessary if each exciting winding were in circuit with a positive and a negative brush and not interconnected.

Having fully described my invention, what I claim as new and desire to secure by Letters Patent of the United States is:

1. In an alternating current motor, the combination of an inducing member provided with a commuted winding, an induced member provided with a plurality of exciting windings adapted to produce an N-pole magnetization of more than two poles, a plurality of brushes on the commutator, one of said exciting windings being connected in series with a pair of brushes of positive polarity and a second exciting winding being connected in series with a pair of brushes of negative polarity, and means for interconnecting said exciting windings.

2. In an alternating current motor, the combination of an inducing member provided with a commuted winding, an induced member provided with a plurality of exciting windings adapted to produce an N-pole magnetization of more than two poles, a plurality of brushes on the commutator, one of said exciting windings being connected in series with a pair of brushes of positive polarity and a second exciting winding being connected in series with a pair of brushes of negative polarity, and means for interconnecting the middle points of said exciting windings.

3. In an alternating current motor, the combination of an inducing member provided with a commuted winding, an induced member provided with a plurality of exciting windings adapted to produce N-pole magnetization of more than two poles, a plurality of brushes on the commutator, one of said exciting windings being connected in series with a pair of brushes of positive polarity and a second exciting winding being connected in series with a pair of brushes of negative polarity, and means comprising an adjustable resistance for interconnecting said exciting windings.

4. In an alternating current motor, the combination of an inducing member provided with an inducing winding and a commuted winding, an induced member provided with a plurality of exciting windings adapted to produce an N-pole magnetization of more than two poles, a plurality of brushes on the commutator, one of said exciting windings being connected in series with a pair of brushes of positive polarity and a second exciting winding being connected in series with a pair of brushes of negative polarity, means for interconnecting said exciting windings, and a secondary winding on the induced member axially displaced from the exciting windings.

5. In an alternating current motor, the combination of an inducing member provided with a commuted winding, an induced member provided with a plurality of exciting windings adapted to produce an N-pole magnetization of more than two poles, a plurality of brushes on the commutator by means of which exciting E. M. F. is supplied to the exciting windings, the brushes and exciting windings being so connected that the only current path external to the commuted winding between brushes of like polarity is through an exciting winding.

In testimony whereof, I have hereunto set my hand this the 12th day of May, 1924.

HANS WEICHSEL.